Feb. 23, 1926.

S. HERNES

SAW SET

Filed July 18, 1925

1,574,032

Witness:
Chas. R. Koursh

Inventor,
Soren Hernes
Benj. T. Rowd Atty.

Patented Feb. 23, 1926.

1,574,032

UNITED STATES PATENT OFFICE.

SOREN HERNES, OF CHICAGO, ILLINOIS.

SAW SET.

Application filed July 18, 1925. Serial No. 44,483.

*To all whom it may concern:*

Be it known that I, SOREN HERNES, a citizen of the Kingdom of Norway, residing at Chicago, in the county of Cook and State of Illinois, have invented a new and useful Improvement in a Saw Set, of which the following is a specification.

My present invention relates to the provision of a saw-set, or instrument for setting, or slightly bending in opposite directions, the successive teeth of saws. My instrument is particularly adapted for use with band-saws and I provide instrumentalities whereby a plurality of the teeth may be set in a single operation. I have provided means whereby the instrument may be adjusted for saws having teeth of different length, and, also, for saws having different width of blade, and by suitable adjustment with the last means, the extent of set may be controlled. Means are also provided for adjusting the apparatus to saw blades of different thickness, and the apparatus is so designed that by the movement for releasing the setting elements the saw is fed forward to bring new teeth into position for setting.

I attain the foregoing object by the structure illustrated in the accompany drawing, in which—

Figure 1:
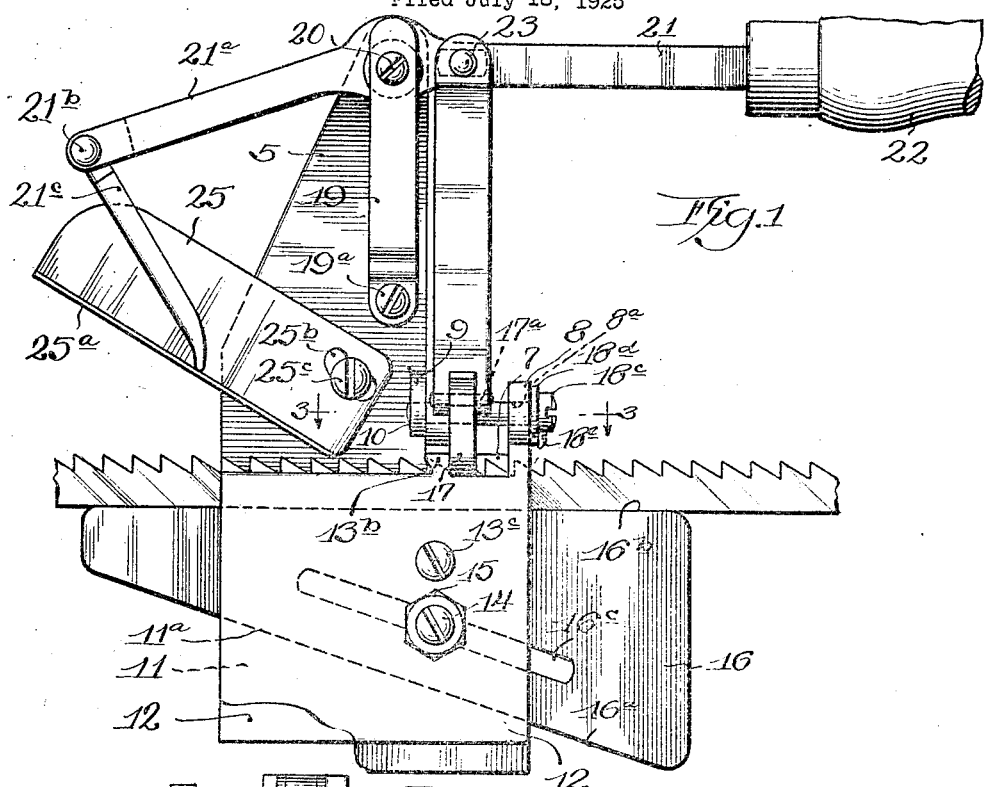
Fig. 1 is a fragmental side elevation of my invention.

As will be hereafter seen, the bending elements are levers pivoted to swing about an axis situated in the plane of and above or spaced from the teeth to be bent and operate upon a plurality of successive teeth at the same time but in opposite directions thereby utilizing most of the force applied in the actual bending or setting of the teeth. For presenting the teeth properly to the bending elements a slot is provided in which the back of the saw blade is received and travels, and this slot is adjustable for both depth and width to accommodate saws of different width and thickness.

The plates forming the sides of the slot above referred to are extended upwardly at points opposite the location of the bending elements, and these extensions are beveled or inclined from the plane of the saw thereby limiting the action of the bending elements and forming stops beyond which the teeth cannot be bent.

These beveled extensions, or bending stops, moreover, in association with the adjustment for regulating the depth of the slot, provide facilities for adjusting the set of the teeth or the extent to which they may be bent. For if the depth of the slot is adjusted to bring the top of the teeth opposite the middle portions of the inclined faces the teeth can only be bent half as far as if the slot was adjusted to bring the teeth opposite the top of the inclined faces.

The bending elements are actuated through links connecting them with the intermediate portion of a pivoted lever arm, which arm is extended beyond its pivoted bearing and carries on the extended end a pawl which engages the teeth of the saw to feed it through the slot to the bending elements.

In connection with this feeding pawl I have provided a flanged plate which acts as a guide therefor, and through the supporting of this feed guide through an arcuate slot and a set screw the guide may be adjusted both laterally and pivotally to feed teeth of different length.

In order to adjust the bending elements to operate on saws having different lengths of teeth I pivot both bending elements upon a single pintle, a portion of which is threaded, and tap the bearing of one of the bending elements to engage with the thread on the pintle, so that by rotating the pintle the bending elements will be brought nearer together, or separated, in accordance with the direction in which the pintle is rotated.

The divers instrumentalities are, preferably, mounted upon a vertically disposed plate, 5. Suitably secured by pins, or otherwise, across the bottom of plate, 5, is plate, 6, the lower edge whereof extends below the plate, 5, to provide, at $6^a$, a means for securing the apparatus in a vise, or any other desired location. At the top of the right of plate, 6, is an extension, 7, the top of which is angled slightly with the front of plate, 6, to form an angle to co-operate with and form a stop for one of the setting or bending members hereafter to be described. Extending parallel with the right-hand edge of plate, 6, vertically, above the top thereof, is a lug, 8, which is centrally bored, at $8^a$, for the pintle upon which the setting, or bending, members are pivoted. Also, extending forwardly from plate, 5, above plate, 6, is another lug, 9, which is provided with a bore, 10, aligning with the bore, 8ª, in lug, 8, to receive one end of the pintle heretofore alluded to. To the face of plate, 6, and at the bottom thereof, is secured a plate, 11, the upper edge, 11ª, whereof, is arranged diagonally with the horizontal, or with the bottom, of plates, 5 and 6. Pins, 12, extend laterally from plate, 6, through plate, 11, and to receive plate, 13, properly bored for the reception of said pins, 12, and held to plate, 6, by screw, 14, and locknut, 15. Resting and sliding on the top of plate, 11, is plate, 16, the lower edge, 16ª, whereof, is inclined oppositely to the top of plate, 11, and the upper edge, 16ᵇ, whereof, is at right angles to the planes of rotation of the forming members hereafter to be described. Plate, 16, has provided therein a slot, 16ᶜ, inclined and parallel with the bottom of said plate, through which screw, 14, passes. It will now be seen that by drawing plate, 16, to the right the apparatus will accommodate a saw blade of greater width, whereas, by pressing plate, 16, to the left the depth of the channel for the passage of the saw blade will be decreased.

Extending upwardly from the top of plate, 13, is a projection, 13ᵇ, the inner face of which is beveled outwardly and constitutes an anvil, or stop, for the first forming member. These forming members, 17, are provided with bores, 17ª, in both ends; the rear forming member having its inner bore, 17ª, tapped. The pintle, 18, which passes through the perforations in the lugs, 8 and 9, has the portion nearest its head, which engages with the rear forming member, threaded as at 18ª, while the forward portion, 18ᵇ, thereof, which co-operates with the forward forming member, is without threads.

The pintle, 18, is provided with a slotted screw head, 18ᶜ, the edge whereof is cut away to form the shoulder, 18ᵈ; the lug, 8, is, preferably, tapped adjacent the shoulder, 18ᵈ, and a screw, 18ᵉ, is screw into the hole and down upon the shoulder, 18ᵈ, to secure the pintle in adjusted position. It will be now seen that as the bore in the forward bending member, 17, is unthreaded, the rotation of the pintle will have no effect thereon, but the bore, 17ª, in the rear forming member, being threaded and co-acting with the threaded portion, 18ª, of the pintle, a rotation of the pintle will cause the rear bending element, 17, to either advance to or recede from the front bending member.

Figure 2:
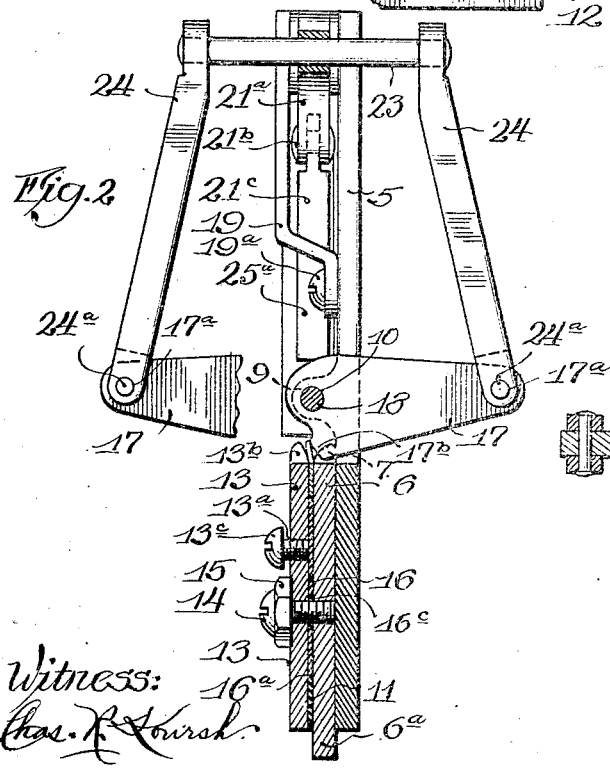
Fig. 2 is a fragmental vertical section on line 2—2 of Fig. 1.
Figure 3:
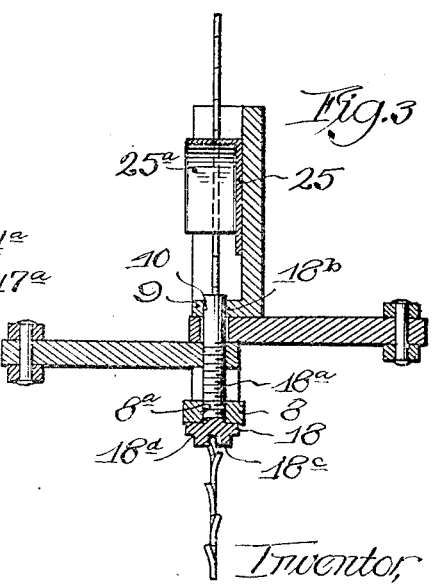
Fig. 3 is a fragmental vertical section on line 3—3 of Fig. 1.

A bracket, 19, is screwed to plate, 5, by screw 19ª, so that the top of the bracket extends adjacent the top of plate, 5, and through the top of the bracket and, through the top of said plate, 5, extends a bolt, 20, upon which and between the bracket and the plate the operating handle is pivoted. From the pivotal connection at 20, the operating handle, 21, extends to the right and on its outer end is provided with a handle, 22. Between the handle, 22, and the pivot, 20, the handle, 21, has provided transversely thereof a rod, or shaft, 23, to the outer ends of which are pivoted the links, 24, the lower ends whereof are bifurcated to receive the outer ends of the bending members, 17, to which they are secured by pins, 24ª. As will be clearly seen in Fig. 2 the lower inner ends of the bending members, 17, are provided with the projections, 17ᵇ, which engage and bend the teeth as the handle, 22, is depressed.

The lever arm, 21, is extended beyond its pivotal connection, 20, as at 21ª, and to the forward end thereof is secured, by a pintle, 21ᵇ, a pawl, 21ᶜ. The lower end of the pawl, 21ᶜ, rests on the flange, 25ª, of the guide plate, 25. The upper right-hand corner of the guide plate is provided with an arcuate slot, 25ᵇ, through which a set screw, 25ᶜ, extends into trapped aperture in the plate, 5. As will be clearly seen from an examination of Fig. 1 the retraction, or pressing forward, of the guide plate, 25, together with the tilting thereof will cause the dependent pawl, 21ᶜ, to strike any desired distance in front of the projection, 13ᵇ, on the plate, 13, thereby enabling the apparatus to be set for any length of teeth which the saw to be operated on has and, also, to take any two or more of such teeth and feed them into position to be operated upon by the bending, or setting, members, 17. For the purpose of adjusting the slot to receive saw blades of different thicknesses, the plate, 13, is bored and tapped some distance above the location of the screw, 14, as at 13ª, for the receipt of machine screw, 13ᶜ. It will be seen that by screwing screw 13ᶜ through plate, 13, the upper part of plate, 13, will be forced away from plate, 6, thereby widening the slot for the receipt of the saw blade; while the retraction of the screw, 13ᶜ, in connection with the manipulation of the screw, 14, will cause the narrowing of this slot.

Having described my invention, what I claim is new and desire to secure by Letters Patent, is—

1. A saw-set comprising a plurality of oppositely moving bending members in combination with members providing a slot to receive a saw and locate the same below and in coactive relation with said bending members and an operating lever linked to said bending members.

2. A saw-set comprising a plurality of oppositely moving bending members in combination with a mounting provided with a slot to receive and locate the saw in coactive relation with said bending members, and an operating lever linked to said bending members, said operating lever being extended beyond its pivoted mounting and provided with a pawl for feeding the teeth of the saw, to be operated upon, to the bending members.

3. A saw-set comprising a mounting having a slot therein for the receipt of a saw, inclined stops extending from said mounting above and on opposite sides of said slot in staggered relation, bending members pivoted opposite said respective stops, and a lever linked to said bending members.

4. A saw-set comprising a mounting having a slot therein for the receipt of a saw, inclined stops extending from said mounting above and on opposite sides of said slot in staggered relation, bending members pivoted opposite said respective stops, and means for swinging said bending members in opposite directions.

5. In a saw-set comprising a mounting having a slot, stops upon said mounting successively arranged upon opposite sides of said slot, bending elements pivoted opposite said respective stops, means for actuating said bending elements, and means for adjusting the depths of said slot.

6. In a saw-set comprising a mounting having a slot, stops upon said mounting successively arranged upon opposite sides of said slot, bending elements pivoted opposite said respective stops, means for actuating said bending elements, means for adjusting the depth of said slot, and separate means for adjusting the width of said slot.

7. In a saw-set comprising a mounting having a slot, stops upon said mounting rising above and upon opposite sides of said slot, bending elements pivoted opposite said respective stops, means for varying the distance between said bending elements, and means for moving said bending elements toward and away from their respective stops.

8. In a saw-set comprising a mounting having a slot, stops upon said mounting upon opposite sides of said slot, bending elements pivoted opposite said respective stops, means for varying the distance between said bending elements comprising a common pintle with which one of said bending elements has threaded relation, and means for moving said bending elements toward and away from their respective stops.

9. A saw-set comprising a plurality of oppositely moving bending members in combination with a mounting provided with a slot to receive and locate the same in coactive relation with said bending members, and an operating lever linked to said bending members, said operating lever being extended beyond its pivoted mounting and provided with a pawl for feeding the teeth of the saw, to be operated upon, to the bending members, and means for adjusting the latitude of feed of said pawl.

10. A saw-set comprising a plurality of oppositely moving bending members in combination with a mounting provided with a slot to receive and locate the same in coactive relation with said bending members, and an operating lever linked to said bending members, said operating lever being extended beyond its pivoted mounting and provided with a pawl for feeding the teeth of the saw, to be operated upon, to the bending members, and means for adjusting the latitude of feed of said pawl consisting of a guide for said pawl having lateral and pivotal adjustment.

SOREN HERNES.